United States Patent [19]

Driver

[11] Patent Number: 5,172,730
[45] Date of Patent: Dec. 22, 1992

[54] TWO-WALL LEAKAGE DETECTION SYSTEM FOR A PIPE

[75] Inventor: F. Thomas Driver, Memphis, Tenn.

[73] Assignee: Insituform of North American, Inc., Memphis, Tenn.

[21] Appl. No.: 831,629

[22] Filed: Feb. 7, 1992

Related U.S. Application Data

[63] Continuation of Ser. No. 374,995, Jul. 3, 1989, abandoned.

[51] Int. Cl.$^5$ ............................................. F16L 55/18
[52] U.S. Cl. ...................................... 138/104; 138/98; 138/103; 138/178; 73/40.5 R; 73/49.1; 73/49.5; 174/11 R
[58] Field of Search ......... 138/103, 104, 178, DIG. 6, 138/97, 98; 73/40.5 R, 49.1, 49.5; 340/605; 174/11 R; 116/208, 112, 264, DIG. 7; 29/402.09, 407; 264/36, 269; 405/150, 154

[56] References Cited

U.S. PATENT DOCUMENTS

| | | | |
|---|---|---|---|
| 3,025,606 | 3/1962 | Turner | 73/40.5 R |
| 3,254,012 | 5/1966 | Ziegler | 138/103 |
| 4,013,924 | 3/1977 | Christensen et al. | 174/11 R |
| 4,029,889 | 6/1977 | Mizuuchi | 340/605 |
| 4,288,654 | 9/1981 | Blom et al. | 73/40.5 R |
| 4,487,057 | 12/1984 | Lutz | 73/40.5 R |
| 4,797,621 | 1/1989 | Anderson et al. | 73/40.5 R |
| 4,800,128 | 1/1989 | Schacht et al. | 340/605 |

FOREIGN PATENT DOCUMENTS

| | | | |
|---|---|---|---|
| 3047908 | 7/1982 | Fed. Rep. of Germany | 138/104 |
| 3419705 | 11/1985 | Fed. Rep. of Germany | 174/11 R |
| 2618877 | 2/1989 | France | 138/104 |
| 54-69822 | 6/1979 | Japan | 138/104 |
| 612102 | 6/1978 | U.S.S.R. | 73/40.5 R |
| 1355176 | 6/1974 | United Kingdom | 73/40.5 R |

*Primary Examiner*—James E. Bryant, III
*Attorney, Agent, or Firm*—James & Franklin

[57] ABSTRACT

An elongated fluid detection device, together with a body of absorbent material, is located between the inner surface of a pipe and an impervious liner spaced from the inner surface thereof, the detection device being operatively connected to an external station. The impervious layer may be of a type normally used for relining defective pipes in situ, and the body of absorbent material, together with the fluid detecting element, preferably substantially filling the cylindrical space between the inner surface of the pipe and the impervious liner.

2 Claims, 2 Drawing Sheets

TWO-WALL LEAKAGE DETECTION SYSTEM FOR A PIPE

This is a continuation of co-pending application Ser. No. 07/374,995 filed on Jul. 3, 1989, now abandoned.

This invention relates to the construction of a leakage detection system for an existing pipe and to the method of forming that system in the pipe. The term "pipes" is herein used generically, and includes all types of passageways and conduits.

There is a need, prompted by the Environmental Protection Agency, to require leakage detection systems in connection with pipes or other conduits handling hazardous liquids, chemicals and petroleum products. Involved are both leakage of the normal contents of the pipe, which may result in contamination of the surroundings, and leakage of external fluids into the pipe, which may result in adulteration of the fluids carried by the pipe. Most existing installations handling hazardous liquids, chemicals and petroleum products at the present time do not meet existing or prospective leak detection requirements, and in those instances there is a pressing requirement that they be retrofitted with such systems. This is a difficult and expensive procedure in any event, the time and expense involved being greatly multiplied when the pipes are located underground or in remote and inaccessible locations. Particularly is this true in the case of pipes handling hazardous materials, because when such piping is removed or excavated the piping itself and all excavated or removed material usually must be handled as hazardous waste, involving its removal from the site and its transportation to an approved toxic waste disposal site. In systems which are in use, excessively long down times result for the equipment normally supplied by the pipes, thus materially increasing the economic cost of retrofitting such pipes.

When a leak does occur in a pipe it is important to know not only that it exists but also where and to what extent along the length of the pipe it exists, so that appropriate decisions can be made with respect to amelioration of the situation. For example, is the leak near a place where access to the interior of the pipe can be had, where repair may be accomplished more readily than if the leak is in a more remote location? Is the leak only at a point or over a short length of the pipe, calling for a relatively simple repair or relining, or does it or a plurality of leaks exist over a substantial length of the pipe, calling for a more substantial repair job? And whatever the nature of the repair job, knowing more or less precisely where the leak exists greatly facilitates the repair operation.

Systems are available on the market for sensing and locating the presence of fluids such as those which might be involved in connection with pipe leakage. They usually comprise an elongated sensing element in the form of a cable which is positioned along the length where the presence of fluid is to be detected, that cable being electrically connected to an external control and indicating system which informs the operator of the existence and location of leaks. One such system, sold by Environmental Specialty Products, Inc. of Niles, Ill., under the trademark "PermAlert", is based on time domain reflectometry and operates like radar. Thousands of times each minute, energy pulses are sent out on a "dry" sensor cable. As energy pulses travel down the sensor cable, reflections are returned to the monitoring unit, which digitizes those echoes and creates a digital map of the entire length of the cable. The presence of a fluid around the sensor cable at a particular location in sufficient quantities to "wet" the cable will alter its electrical properties and this alteration will cause a change in the reflection from that cable location. The digital map will indicate the locations where those reflection changes have come about. One problem in utilizing systems of this sort in connection with detecting pipe leakage of fluids is that when the fluid has leaked and engaged the sensor cable it tends to flow along the length of the cable, thus masking, and in some instances completely obliterating, any indication as to where the source of the leak actually is. Thus the presence of a leak will be detected, but indication of its location is unreliable.

Further, a considerable problem exists in applying detection systems of the type under discussion to existing pipes in such a fashion that they will effectively detect leaks but will be unaffected by the fluids normally transported through the pipes. It is, of course, possible to solve this problem by removing existing pipes and replacing them with pipes into which such detection cables or other detecting elements have been built, but, for the reasons set forth above, that is in most instances excessively expensive and difficult.

The present invention provides for the installation in an existing pipe of a novel leakage detection system through the use of conventional and proven techniques, even if the existing pipe is not in perfect condition. Moreover, the system is so constructed that when installed it is much more accurate and reliable in pinpointing the location of leaks in the pipe than known systems.

It is a prime object of the present invention to provide a leak detection system for a pipe which functions in a manner superior to prior systems with respect to reliability of leak detection and location.

It is another prime object of the present invention to provide a method for the amalgamation of an effective leakage detection system in an existing pipe in a comparatively facile and inexpensive manner and without requiring pipe replacement.

It is a further object of the present invention to provide a pipe leakage detection system and a method for installing it in an existing pipe which can be efficiently carried out through the use of known and time-tested techniques.

To those ends, the leak detection system of the present invention comprises an external, at least initially substantially impermeable tube which, when the pipe is in perfect condition, can be the pipe itself, within which a second impervious tube defining what may be termed a pipe-within-a-pipe is provided and which is radially spaced from the inner surface of the outer tube, thereby to produce a two-wall pipe structure. The elongated leak-detecting element is received in the radial space between the two tubes or walls, along with a mass of porous fluid-retentive material, that fluid-retentive material and the detection cable preferably filling that radial space. The body of absorbent material performs two functions: (a) when the leak detection system is in operation and a leak occurs, that material absorbs the liquid at the location of the leak, permits that liquid to then wet the sensing cable so that the leak is detected and its location indicated, but inhibits the liquid from flowing along the cable, so that the cable is accurately location-sensitive, and (b) that body of absorbent material acts to produce the space between the inner and outer tubes by reason of the fact that it, along with the detector element, is first put in place inside the pipe, after which the second impervious tube is inserted, the body of absorbent material itself spacing the inner impervious tube from the pipe itself.

One form that this invention can take, and in connection with which it is here specifically illustrated, involves the forming of the second or inner impervious wall by using soft flexible lining tubes usually comprised of a layer or layers, such as a fibrous layer, which is impregnated with a curable synthetic resin, or which carries on its outer surface an adhesive whereby the lining tube will become bonded to the inner surface of the pipe. These lining tubes may be either pulled into the pipe or everted thereinto, and radially outward pressure is usually applied to that lining tube to press it outwardly into engagement with the inner surface of the pipe or the body of pre-installed absorbent material, as the case may be. In cases where the lining tube is provided with a curable synthetic resin, the resin is usually cured while the inner tube is pressed radially outwardly, and upon such curing the tube becomes a hard, free-standing part of the pipe. The inner impervious tube may also be created by those lining methods where the lining is pulled or pushed into the pipe and then deformed to fit the pipe, as well as by those methods generally known as "sliplining". These methods are but exemplary; the inner impervious tube may be formed in any appropriate fashion, but the methods above set forth are those generally used today in the in situ repair of pipes, and are therefore commercially available.

When the system of the present invention is to be installed in a pipe that is not perfect, which, for example, already has discontinuities or leaks, it is preferred that the pipe first be relined, as by means of one of the conventional relining methods, such as those described above, before the leak detection system of the present invention is installed.

To the accomplishment of the above, and to such other objects as may hereinafter appear, the present invention relates to a leakage detection system for an existing conduit or pipe, and to the method of forming the same in situ in an existing conduit or pipe, as defined in the appended claims and as described in this specification, taken together with the accompanying drawings, in which:

Figure 1:
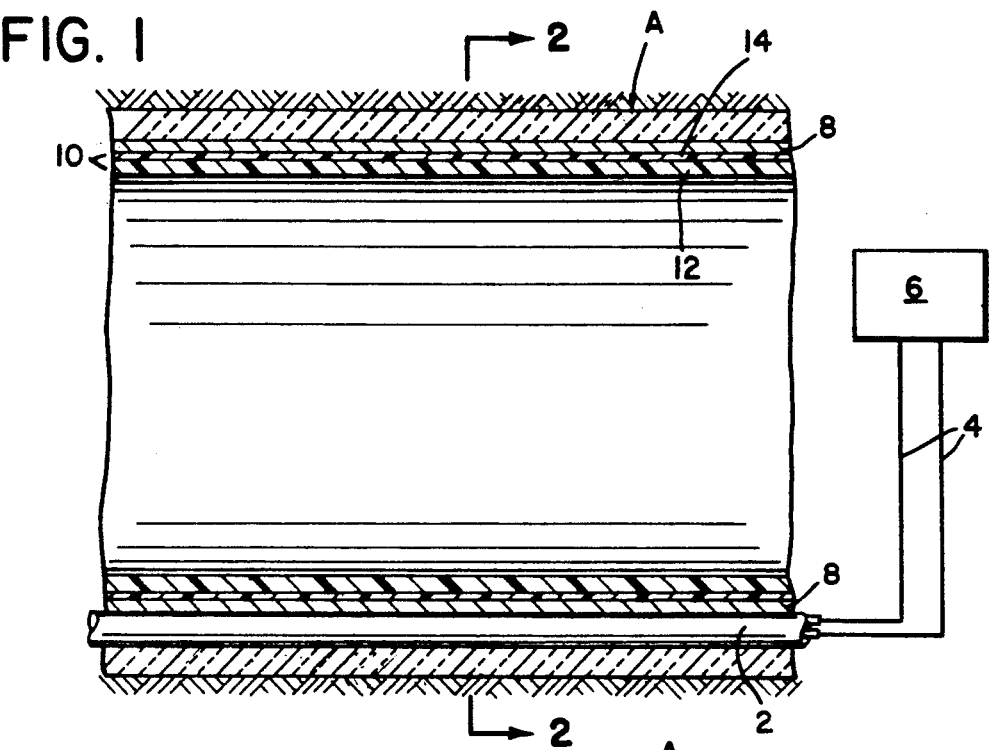
FIG. 1 is a cross-sectional view along the length of a pipe in which the leakage detection system of the present invention has been installed.
Figure 2:
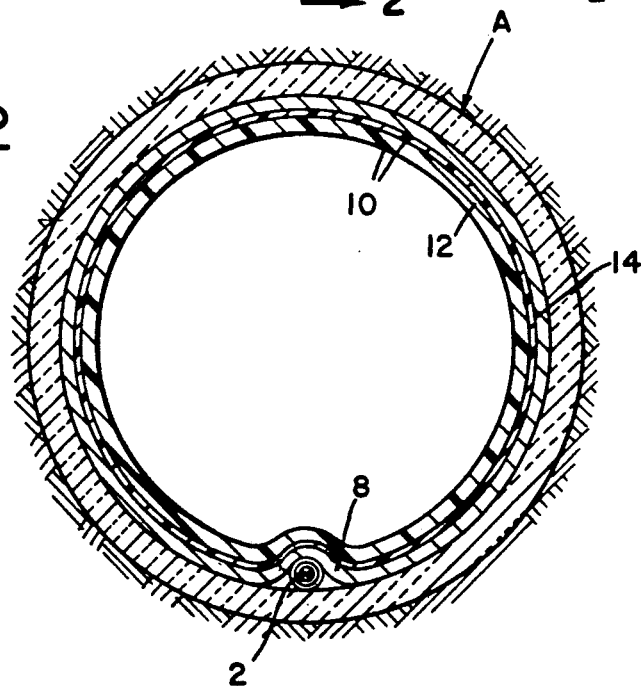
FIG. 2 is a cross-sectional view taken along the line 2—2 of FIG. 1.
Figure 3:
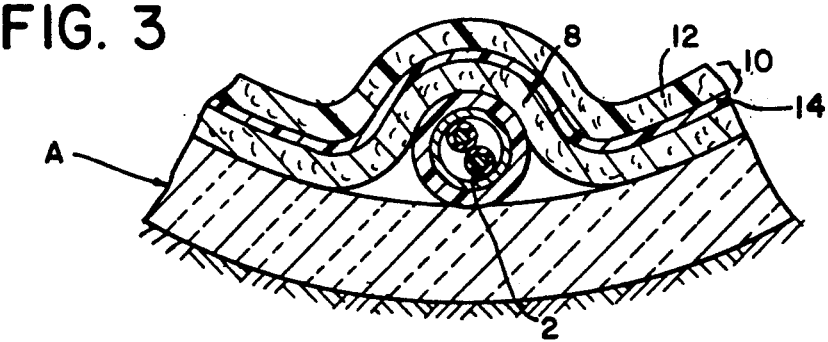
FIG. 3 is an enlarged fragmentary view of the lower portion of FIG. 2.

In preparation for retrofitting pipes for the leak detection system of the present invention, the existing pipes, generally designated A, should first be thoroughly cleaned and inspected for integrity. If the system is found to be sound, the detection system may be installed, but if it is not sound it should be made sound, preferably through the use of any known pipe lining method, before the leak detection system is installed.

As indicated above, the fluid detecting system itself may comprise an elongated cable 2 connected by means of wires 4 to an external control and indicating station 6. The cable 2 is inserted along the length of the pipe A where leak detection is desired, and a relatively thick tube 8 defining a layer of absorbent fluid-retentive material is also put into place inside the pipe A, the cable 2 preferably being interposed between the pipe A and the absorbent tube 8, with the absorbent tube 8 otherwise being substantially in contact with the inner surface of the pipe A, preferably over substantially its entire circumferential extent. The tube 8 will typically be a needled felt of polyester or similar fibers. The cable 2 may be put in place in the pipe A before the tube 8 or it may be secured to the tube 8 while the latter is located externally, the elements 2 and 8 then being inserted into the pipe A simultaneously. Other sequences of operation may suggest themselves, but what is important is that the inside of the pipe A be provided with the absorbent layer 8 and with the detector element 2, both extending along the length of the pipe A where leak detection is desired.

Next, an impervious tube 10 of rigid or semi-rigid material is formed inside the tube 8, that impervious tube 10 thereafter functioning essentially as a pipe-within-a-pipe. That tube 10 may take any desired form. As here specifically disclosed it comprises a layer 12 of porous material impregnated with a curable resin and having a radially outer thin layer 14 of plastic such as polyethylene, that particular embodiment being positioned inside the layer 8 and then pressed radially outwardly into engagement with the layer 8 and subjected to heat to cure the impregnating resin, both the pressure and impregnation steps preferably being accomplished by the use of heated fluid. As indicated above, the layer 10 may be constituted and produced by any one of a variety of methods provided that in the end the layer 10 will function as an impervious pipe-within-a-pipe.

Upon completion of this operation, it will be seen that the original pipe A has now become, in effect, a double-wall pipe, A, 10, with the walls spaced from one another and with that space being substantially filled by the absorbent layer 8 and the leak detector element 2. Any intrusion of foreign liquid into the space between the walls A and 10, whether it comes from the outside through a break in the pipe A or from the inside through a break in the newly formed pipe-within-a-pipe 10, will be absorbed by the layer 8 and detected by the cable 2. The absorbent nature of the layer 8 will ensure to a very large extent that when that leakage fluid reaches the detector cable 2 it will do so at a position along the length of that cable which closely corresponds to the longitudinal position of the leak, and hence the location of the leak will be pinpointed. As a result, if a leak is detected, only a small area of the affected pipe will be repaired either by way of removal or relining.

Figure 4:
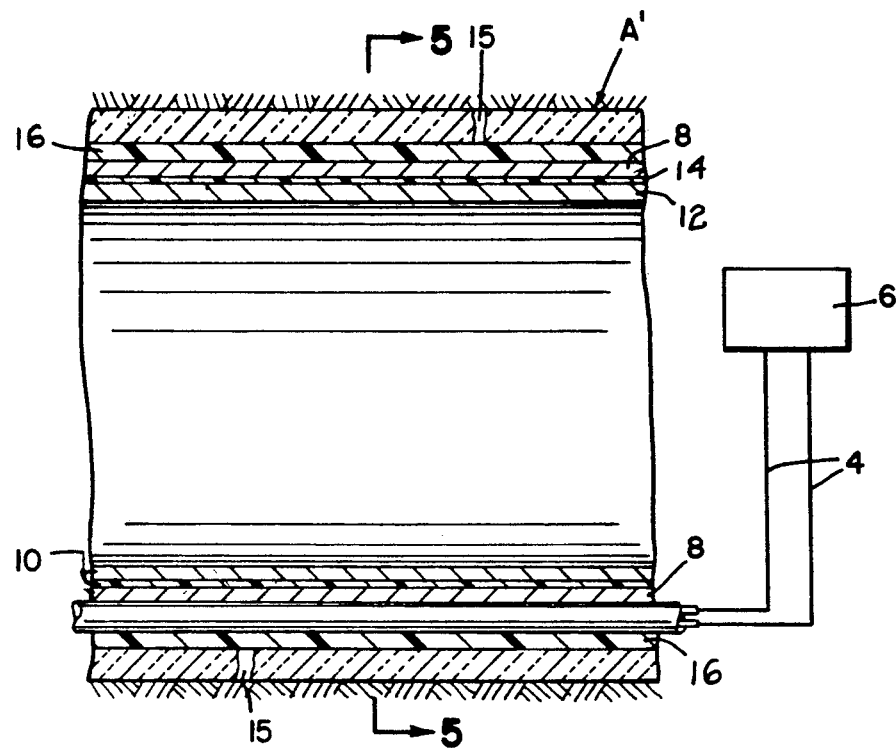
FIGS. 4, 5 and 6 are views similar to FIGS. 1, 2 and 3 but showing the resultant structure when the initial pipe was not in perfect condition before the system was installed.
Figure 5:
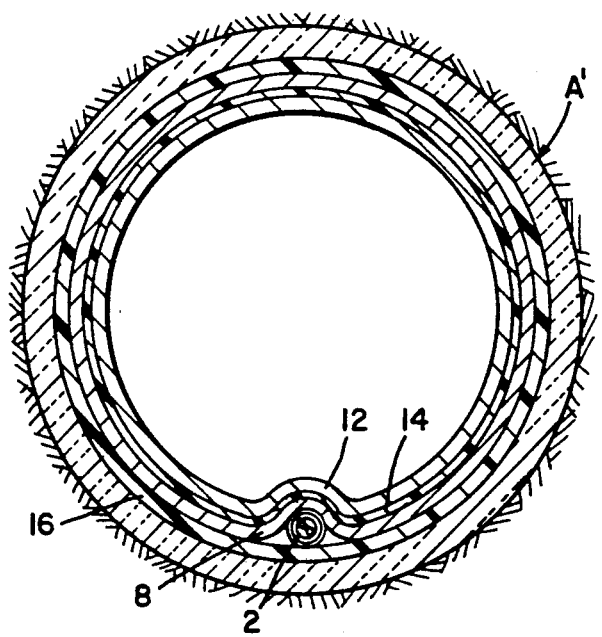
Figure 6:
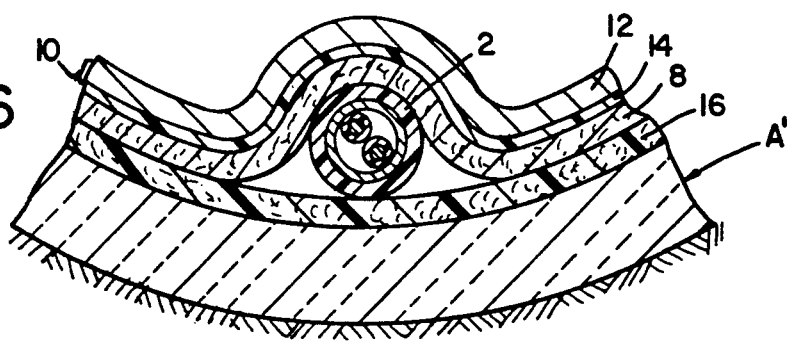

The system of the present invention will not function in optimum fashion if a leak remains unrepaired for any appreciable period of time, because then the absorbent layer 8 at the location of the leak will become saturated and fluid will then slowly move through the layer 8 along the length of the pipe. It therefore is important that the integrity of the pipe A be perfect before the leak detection system is installed. If it is not perfect, and is as shown in FIGS. 4 through 6 where the pipe A' has holes 15 therethrough, the integrity of the pipe A' will first be made perfect by providing it with an impervious lining 16, preferably provided in situ by any known method, that lining 16 thereafter functioning as the radially outer wall of the detection system, against which the absorbent tube 8 is pressed.

Layer 14 may not be needed in some installation procedures, such as when a sliplining is used to produce layer 10.

The detection system and the method of installing it here described have many advantages over the prior art. There is no need to excavate and dismantle existing pipeline systems. Those systems can be retrofitted while the piping is in place, thus reducing expensive rebuilding and down time and without adding to hazardous waste disposal problems. All materials and techniques to accomplish this method are currently available. There is no necessity to develop new relining systems, detection systems, resins, or new fibrous absorbent materials. The use of the present invention involves only a fraction of the cost of excavation, disassembly, disposal and rebuilding such as has been necessary in the past. Moreover, the system of the present invention allows pinpoint detection of leak location because it retains the leaking fluid in a very localized area.

While but a limited number of embodiments have been here specifically disclosed, it will be apparent that many variations may be made therein, all within the spirit of the invention as defined in the following claims.

I claim:

1. A process for retrofitting an existing fluid-carrying circumferentially closed conduit with a leakage detection system comprising (a) inserting along the interior of the conduit and elongated means for detecting the presence of fluid, said fluid detecting means including means for coupling to a monitoring system outside the conduit, (b) inserting a layer of fluid-retentive material in the conduit substantially in contact with said fluid-detecting means and substantially in contact with the inner surface of said conduit over substantially the entire circumferential extent thereof, (c) inserting a fluid-impermeable liner comprising porous material impregnated with a curable resin within the layer of fluid-retentive material, and (d) pressing said liner against said layer of fluid-retentive material while curing said resin, thereby causing said liner to remain positioned substantially against said layer of fluid-retentive material over substantially the entire circumferential extent thereof.

2. In the process of claim 1, where said existing conduit is not sound along its length, the step of providing said unsound existing conduit length with a fluid-impervious pre-lining inside which said fluid detecting means, said layer of fluid-retentive material and said fluid-tight liner of claim 1 are placed.

* * * * *